United States Patent
Obayashi et al.

(10) Patent No.: US 6,925,369 B2
(45) Date of Patent: Aug. 2, 2005

(54) AUTOMOTIVE POWER DISTRIBUTION APPARATUS AND AUXILIARY TERMINAL FOR A USER OPTIONAL LOAD

(75) Inventors: Kazuyoshi Obayashi, Chita-gun (JP); Eiichi Kamei, Nisshin (JP)

(73) Assignee: Denso Corporation, Kariya (JP)

( * ) Notice: Subject to any disclaimer, the term of this patent is extended or adjusted under 35 U.S.C. 154(b) by 64 days.

(21) Appl. No.: 10/345,921

(22) Filed: Jan. 17, 2003

(65) Prior Publication Data

US 2003/0144779 A1 Jul. 31, 2003

(30) Foreign Application Priority Data

Jan. 31, 2002 (JP) ........................................ 2002-023774

(51) Int. Cl.⁷ ............................... B60K 1/04; H02J 7/00
(52) U.S. Cl. ........................... 701/36; 701/22; 180/65.2
(58) Field of Search ................................ 701/1, 22, 36; 180/65.2, 65.3; 18/65.2

(56) References Cited

U.S. PATENT DOCUMENTS

| | | | | |
|---|---|---|---|---|
| 5,534,759 A | * | 7/1996 | Evans et al. | 318/139 |
| 5,845,221 A | * | 12/1998 | Hosokawa et al. | 701/36 |
| 6,003,626 A | * | 12/1999 | Ibaraki et al. | 180/65.2 |
| 6,208,931 B1 | * | 3/2001 | Schoettle et al. | 701/115 |
| 6,242,873 B1 | * | 6/2001 | Drozdz et al. | 318/139 |
| 6,624,529 B2 | | 9/2003 | Obayashi | 290/40 C |
| 6,700,386 B2 | * | 3/2004 | Egami | 324/503 |

FOREIGN PATENT DOCUMENTS

| JP | A 5-77680 | 3/1993 |
|---|---|---|
| JP | A 6-278505 | 10/1994 |
| JP | A 2002-199505 | 7/2002 |

* cited by examiner

Primary Examiner—Tan Q. Nguyen
(74) Attorney, Agent, or Firm—Oliff & Berridge, PLC (57) ABSTRACT

A load calculator detects a specific electric amount separately from an essential electric amount. The specific electric amount represents an electric power consumption of specific electric loads including at least one economizable electric load which is selectively turned on and off so as to serve as an objective to be economized in power consumption. The essential electric amount represents an electric power consumption of essential electric loads which are not economizable and essentially required for driving an automotive vehicle. A power saving promoting element promotes power saving by reducing power consumption in the economizable electric load with reference to the specific electric amount.

19 Claims, 6 Drawing Sheets

AUTOMOTIVE POWER DISTRIBUTION APPARATUS AND AUXILIARY TERMINAL FOR A USER OPTIONAL LOAD

BACKGROUND OF THE INVENTION

This invention relates to an automotive power distribution apparatus and an auxiliary terminal for a user optional load.

For the purpose of realizing fuel saving or economic driving, an automotive vehicle is equipped with a fuel economy meter which is capable of displaying a fuel consumption rate on a screen of an instrument panel to let a vehicle driver perceive or confirm the present state of fuel economy indicated by a numerical value.

To save a total fuel amount to be consumed in his/her car, a vehicle driver may intentionally turn off an air-conditioning apparatus or other car-equipped electric loads. In such a case, the vehicle driver watches the fuel economy meter to check the effect of saved fuel. However, the conventional fuel economy meter is chiefly designed to indicate the performance of an internal combustion engine. The conventional fuel economy meter cannot provide a clearly understandable indication when the vehicle driver wants to know the fuel saving effect brought by turning off an air-conditioning apparatus or other car-equipped electric loads. In this respect, the conventional fuel economy meter may not be satisfactory for a vehicle driver who has an acute intent to realize efficient power/fuel saving and economy driving.

Furthermore, the conventional fuel economy meter indicates a fuel consumption value converted from a sum of a vehicle driving power and a generated electric power. The car-equipped electric load is driven by electric power generated by a generator or stored in a battery. The change (i.e., activation/deactivation) of each car-equipped electric load does not immediately reflect as a change in the fuel consumption. Regardless of driver's intent, other vehicular electric loads may be temporarily or intermittently turned off or deactivated when an automotive vehicle is traveling. Hence, it was very difficult for a vehicle driver to exactly know the fuel saving effect brought by turning off an air-conditioning apparatus or other car-equipped electric loads.

SUMMARY OF THE INVENTION

In view of the above-described problems of the prior art, the present invention has an object to provide an automotive power distribution apparatus brings an excellent effect in suppressing excessive use of electric power and fuel or in encouraging a vehicle driver to positively behave to save the electric power and fuel consumption.

Furthermore, the present invention has an object to provide an auxiliary terminal for a user optional load usable in the automotive power distribution apparatus of the present invention.

In order to accomplish the above and other related objects, the present invention provides an automotive power distribution apparatus for supplying electric power to a plurality of car-equipped electric loads from an automotive power source including a battery. The automotive power distribution apparatus of this invention includes a detecting element for detecting a specific electric amount separately from an essential electric amount. The specific electric amount detected by the detecting element represents an electric power consumption of specific electric loads including at least one economizable electric load which is selectively turned on and off so as to serve as an objective to be economized in power consumption. The essential electric amount detected by the detecting element represents an electric power consumption of essential electric loads which are not economizable and essentially required for driving an automotive vehicle. A power saving promoting element is provided for promoting power saving by reducing power consumption in the economizable electric load with reference to the specific electric amount.

Preferably, the detecting element does not detect the essential electric amount.

Preferably, the power saving promoting element includes a display element for realizing a visual or audible display to let a vehicle driver know the specific electric amount or relevant power saving information.

Preferably, the power saving promoting element includes a control element for activating or deactivating the economizable electric load in a power saving mode for reducing the specific electric amount when the specific electric amount exceeds a predetermined threshold level.

Preferably, the specific electric amount is a command signal supplied to a control means for activating the economizable electric load or a signal relating to the command signal.

Preferably, the specific electric amount detected by the detecting element includes an electric amount relating to a current flowing across a user optional terminal which is attached to the battery for supplying electric power to a user optional electric load serving as the economizable electric load.

Preferably, the automotive power distribution apparatus further includes a calculating element for calculating relevant power saving information based on the specific electric amount.

Preferably, the relevant power saving information calculated by the calculating element is information relating to fuel cost reduction representing a power saving effect brought by the economizable electric load. The information relating to fuel cost reduction is calculated based on a unit price of fuel consumed by the automotive vehicle and the specific electric amount.

Preferably, the calculating element is associated with a means for inputting the unit price of fuel from the outside of the automotive vehicle.

Preferably, the relevant power saving information calculated by the calculating element is information relating to fuel consumption per unit electric power which changes in accordance with a vehicle traveling condition or an operating condition of a power generating device.

Preferably, the calculating element calculates a fuel consumption equivalent to an electric power consumed in the economizable electric load based on the fuel consumption per unit electric power and the specific electric amount.

Preferably, the automotive power distribution apparatus includes a calculating element for converting power consumption data of the economizable electric load obtained based on the specific electric amount into relevant power saving information which is expressible by using a plurality kinds of units for display and for outputting the converted relevant power saving information to the power saving promoting element. A switching element is provided for changing the units to be adopted by the calculating element.

Preferably, the units for display include at least two units selected from the group consisting of a fuel consumption deterioration rate, a consumed electric power, a fuel consumption per unit traveling distance, a fuel consumption per unit time, a fuel cost per unit traveling distance, and a fuel cost per unit time.

Preferably, the display element changes at least one of a display brightness, a display color, a display light flickering interval, and a sound effect with reference to a level of the specific electric amount or the relevant power saving information.

Preferably, the display element outputs a warning signal when the specific electric amount or the relevant power saving information exceeds a predetermined level.

Preferably, the control element brings the economizable electric load into the power saving mode when the specific electric amount or the relevant power saving information exceeds a predetermined level continuously for a predetermined time.

Preferably, the control element stops power supply to the economizable electric load when the specific electric amount or the relevant power saving information exceeds a predetermined level continuously for a predetermined time.

Preferably, the control element includes a means for releasing the power saving mode or resuming the power supply to the economizable electric load in response to a reset signal entered by a vehicle driver.

Preferably, the control element changes the threshold level according to a command signal entered by a vehicle driver.

Furthermore, the present invention provides an auxiliary terminal for a user optional electric load, including a plate body having one end connected to one of positive and negative terminals of a battery. The other end of the plate body is connected to a cable supplying electric power to the user optional electric load.

Preferably, one end of the plate body has an engaging hole coupled around the positive or negative terminal of the battery.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained hereinafter with reference to attached drawings. Identical parts are denoted by the same reference numerals throughout the drawings.

Apparatus Arrangement

Figure 1:
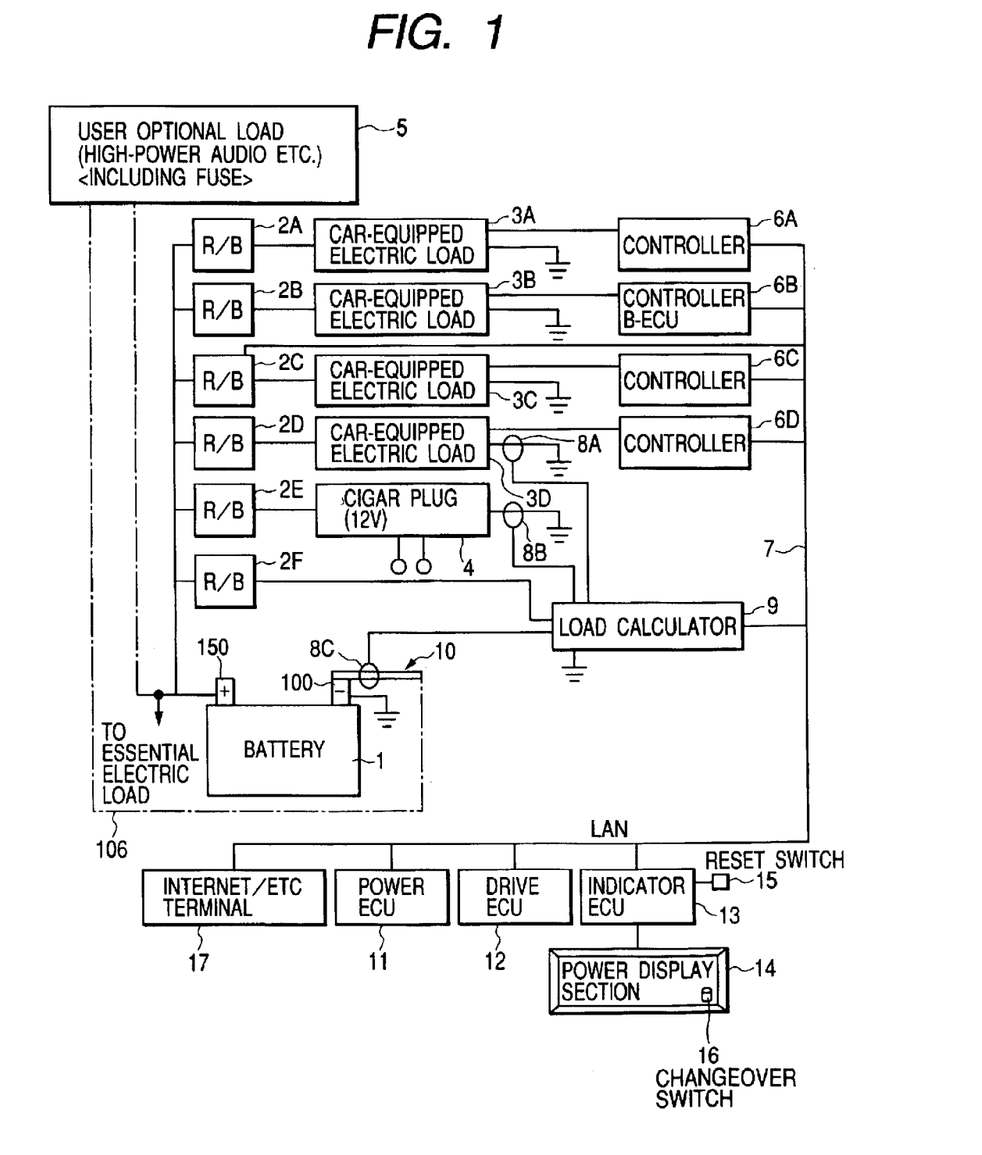
FIG. 1 is a block diagram showing an automotive power distribution apparatus in accordance with a preferred embodiment of the present invention.

FIG. 1 is a block diagram showing an automotive power distribution apparatus in accordance with a preferred embodiment of the present invention. The automotive power distribution apparatus shown in FIG. 1 includes a battery 1, a plurality of relays 2A to 2F, a plurality of vehicular or car-equipped electric loads 3A to 3D, a cigar plug 4, a user optional electric load 5, a plurality of controllers 6A to 6D, a bus line 7, a plurality of current sensors 8A to 8C, a load calculator 9, a user optional terminal plate 10, a power administration section (i.e., power ECU) 11, a drive ECU 12, an instrument panel administration section (i.e., indicator ECU) 13, a power display section 14, a reset switch 15, a changeover switch 16, and an Internet/ETC terminal 17.

More specifically, the relay $2i$ (i=A, B, C, D) and the corresponding car-equipped electric load $3i$ (i=A, B, C, D) are serially connected between two (positive and negative) terminals of the battery 1. Similarly, the relay 2E and the cigar plug 4 are serially connected between two (positive and negative) terminals of the battery 1. The relay 2F is directly connected to the load calculator 9. The current sensor 8A, measuring the current flowing across the car-equipped electric load 3D, is also connected to the load calculator 9. The current sensor 8B, measuring the current flowing across the cigar plug 4, is also connected to the load calculator 9. The current sensor 8C, measuring the current flowing across the user optional electric load 5, is also connected to the load calculator 9.

The Internet/ETC terminal 17, the power ECU 11, the drive ECU 12, and the indicator ECU 13 are connected to each other via the bus line (i.e., LAN) 7.

The controller $6i$ (i=A, B, C) has one terminal connected to the corresponding car-equipped electric load $3i$ (i=A, B, C) for controlling it and the other terminal connected to the bus line 7.

The load calculator 9, grounded via its ground terminal, has a communication terminal connected to the bus line 7. The load calculator 9 converts each output signal of current sensors 8A to 8C into a digital signal representing a measured current value. Furthermore, the load calculator 9 estimates the power consumption in each car-equipped electric load $3i$ (i=A, B, C) via its controller $6i$ (i=A, B, C).

The user optional electric load 5 has one end terminal directly connected to the positive terminal 150 of battery 1 and the other terminal connected to the negative terminal 100 of battery 1 via the user optional terminal plate 10 which is, for example, a copper piece attached to the negative terminal 100. The current sensor 8C, which is for example a well-known hall device type sensor or other kind of sensor, is attached to the user optional terminal plate 10. The user optional electric load 5 is an audio device, a video device, or the like which is later equipped or installed in an automotive vehicle according to user's preference.

The indicator ECU 13 is connected to the power display section 14 and to the reset switch 15. The changeover switch 16 is attached to the power display section 14 for allowing a user to change the display pattern of the power display section 14.

The power ECU 11 administrates an electric power system installed in an automotive vehicle. The drive ECU 12 controls an internal combustion engine and any other vehicle driving device. The indicator ECU 13 controls various kinds of the units for display, including the power display section 14, disposed on a console panel in a passenger compartment of the automotive vehicle. The reset switch 15 allows a user to input a reset signal into the indicator ECU 13.

The car-equipped electric loads 3A to 3D are specific electric loads serving as objectives to be economized in power consumption and are accordingly discriminable from essential electric loads required for driving an automotive vehicle. In this respect, the car-equipped electric loads 3A to 3D may be referred to as economizable electric loads. Via the relays 2A to 2D, electric power is supplied from the battery 1 to respective car-equipped electric loads 3A to 3D. The cigar plug 4 and the user optional electric load 5 are also electric loads serving as objectives to be economized in power consumption. The cigar plug 4 receives electric power from the battery 1 via the relay 2E. The user optional electric load 5 directly receives electric power from the battery 1, although the user optional electric load 5 includes a built-in fuse.

The current sensors 8A and 8C are connected closely to the ground line. However, it is possible to position the current sensors 8A and 8C to the high-voltage side in the power supply circuit to each electric load.

As understood from FIG. 1, this embodiment provides an automotive power distribution apparatus for supplying electric power to a plurality of car-equipped electric loads (3A–3D, 4, 5) from an automotive power source including a battery (1). A detecting element (i.e., load calculator 9) is provided for detecting a specific electric amount separately from an essential electric amount. The specific electric amount represents an electric power consumption of specific electric loads including at least one economizable electric load (3A–3D, 4, 5) which is selectively turned on and off, for example, by a vehicle driver. Thus, each economizable electric load (3A–3D, 4, 5) serves as an objective to be economized in power consumption. The essential electric amount represents an electric power consumption of essential electric loads which are not economizable and essentially required for driving an automotive vehicle.

A power saving promoting element (i.e., power ECU 11, indicator ECU 13, and power display section 14) is provided for promoting power saving by reducing power consumption in each economizable electric load (3A–3D, 4, 5) with reference to the specific electric amount.

According to the arrangement of the above-described automotive power distribution apparatus, the detecting element (i.e., load calculator 9) exclusively detects the specific electric amount (e.g., electric power consumption) of specific electric loads including at least one economizable electric load (3A–3D, 4, 5) which is selectively turned on and off, for example, by a vehicle driver so as to serve as an objective to be economized in power consumption. In other words, the detecting elements discriminates the specific electric amount from the essential electric amount. The essential electric amount represents an electric power consumption of essential electric loads which are not economizable and essentially required for driving an automotive vehicle.

The economizable electric load, such as an air-conditioning apparatus and audio/video devices, may be referred to as comfortableness-oriented electric load in the sense that a vehicle driver turns on or activates it for creating a comfortable atmosphere in an automotive vehicle. The power saving promoting element (i.e., power ECU 11, indicator ECU 13, and power display section 14) promotes power saving by reducing power consumption in each economizable electric load with reference to the specific electric amount. Thus, it becomes possible to improve fuel economy. A vehicle driver will control himself/herself to stop too much use of economizable electric loads.

The specific electric amount is, for example, obtained by detecting a current value consumed in each economizable electric load and then multiplying the detected current value with an applied voltage to calculate an electric power consumed in this economizable electric load.

When the electric power consumption of an economizable electric load and an internal impedance are constant, it is possible to calculate the power consumption based on this internal impedance and the applied voltage or in accordance with the operating condition of the economizable electric load. The operating condition of an economizable electric load is easily detectable from the state of a switch which is used to one-and-off control the power supply to this economizable electric load. A control command sent from a control apparatus to this switch is also usable to detect the operating condition of the economizable electric load.

When the detecting element (e.g., a current sensor) detects an electric amount including part of the essential electric amount, the specific electric amount is obtained by subtracting an amount corresponding to part of the essential electric amount from the detected electric amount.

For example, the power saving promoting element may automatically turn off or deactivate an economizable electric load, or reduce the electric power supplied to this economizable electric load, according to a predetermined priority order when the electric power consumption in this economizable electric load exceeds a predetermined threshold level.

Alternatively, the power saving promoting element may indicate or display the names of economizable electric loads to be turned off or deactivated with reference to their consuming electric power. It is also possible for the power saving promoting element to display or inform an electric amount as a functional value expressing the present state of electric power consumption in a concerned economizable electric load.

The detecting element (i.e., load calculator 9) exclusively detects the specific electric amount and does not detect the essential electric amount, so that the electric power consumption of the economizable electric load can be accurately calculated.

The power saving promoting element includes a display element (i.e., power display section 14) for realizing a visual or audible display to let a vehicle driver know the specific electric amount or relevant power saving information. The vehicle driver can surely know or perceive the information relating to the electric power consumed in the economizable electric load. In other words, the vehicle driver is surely encouraged to save the electric power.

Figure 2:
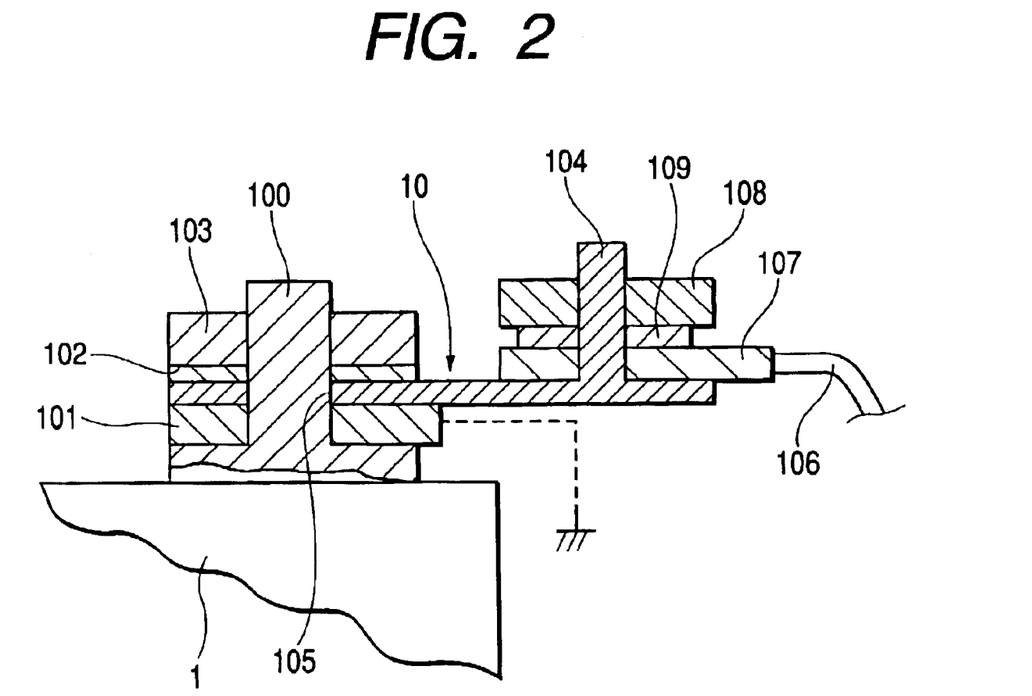
FIG. 2 is a partly cross-sectional view showing a detailed arrangement of a user optional terminal plate connected to a battery in accordance with the preferred embodiment of the present invention.

FIG. 2 is a view showing a detailed arrangement of the user optional terminal plate 10.

The battery 1 has the negative terminal 100 of a threaded pole type which protrudes upward from an upper surface of the battery 1. A metal ring 101 of a ground cable, the user optional terminal plate 10, and a washer 102 are fixed together around the negative terminal 100 by means of a nut 103. The user optional terminal plate 10 is a copper piece having an engaging hole 105 coupled around the negative terminal 100 at one end and an external thread 104 protruding at the other end. The user optional terminal plate 10 is fixedly supported around the negative terminal 100 in a cantilever fashion.

A metal ring 107 of a user optional load cable 106 is fixed around the external thread 104 of the user optional terminal plate 10 by means of a nut 108. The user optional load cable 106 is connected to a ground terminal of the user optional electric load 5. A washer 109 is sandwiched between the metal ring 107 and the nut 108. It is needless to say that the user optional terminal plate 10 can be connected to the positive terminal 150, instead of the negative terminal 100.

The specific electric amount detected by the detecting element (i.e., load calculator 9) includes an electric amount relating to a current flowing across the user optional terminal plate 10 which is attached to the battery 1 for supplying electric power to the user optional electric load 5 serving as an economizable electric load.

According to this arrangement, it is easy to detect the electric power consumed in the user optional electric load 5. Even in a case where numerous cables are connected to a battery electrode, a user can easily connect the cable of the user optional electric load 5 to the battery 1.

The bus line (i.e., LAN) 7 connects all of the controllers 6A to 6D, the load calculator 9, the power ECU 11, the drive ECU 12, and the indicator ECU 13 so as to allow these components to transmit and receive data signals and command signals among them.

Furthermore, each of the car-equipped electric loads 3A to 3C is an electric load whose operating current is predictable. In this respect, a heated windshield device may be involved in the car-equipped electric loads 3A to 3C of this embodiment.

The load calculator 9 detects an operating condition of the controller 6A via the bus line 7, and estimates a power consumption in the car-equipped electric load 3A based on the detected operating condition of controller 6A. The load calculator 9 detects an operating condition of the controller 6B (which is microcomputer-based controller) via the bus line 7, and estimates a power consumption in the car-equipped electric load 3B based on the detected operating condition of controller 6B. The load calculator 9 detects an operating condition of an intelligent power switch (not shown) disposed in the relay 2C via the bus line 7, and estimates a power consumption in the car-equipped electric load 3C based on the detected operating condition of the intelligent power switch (not shown). Furthermore, the load calculator 9 calculates the power consumption in each of the car-equipped electric load 3D, the cigar plug 4, and the user optional electric load 5 based on the current values measured by the current sensors 8A to 8C.

In this respect, the specific electric amount may be a command signal supplied to a control means (6A–6D) for activating each economizable electric load (3A–3D) or a signal relating to the command signal. This requires no current sensor for detecting a current flowing across the economizable electric load. The circuit arrangement can be simplified.

The power ECU 11 receives the calculated data (i.e., information relating to power consumption) from the load calculator 9 via the bus line 7. The power ECU 11 causes the power display section 14 to display the information relating to power consumption or modified data/information. The changeover switch 16 allows the user to change the display pattern of the power display section 14. For example, the units for displaying power consumption may be changed by manipulating the changeover switch 16.

Each of the current sensors 8A to 8C has the capability of simultaneously detecting current values (i.e., power consumption) of a plurality of electric loads. Similarly, each of the controllers 6A to 6C has the capability of controlling a plurality of electric loads. Each of the current sensors 8A to 8C has the capability of detecting a current value based on a voltage drop appearing between terminals of a resistance element.

Calculation of power consumption by the load calculator 9 is performed based on a readout current value and a readout battery voltage.

Operation

Figure 3:
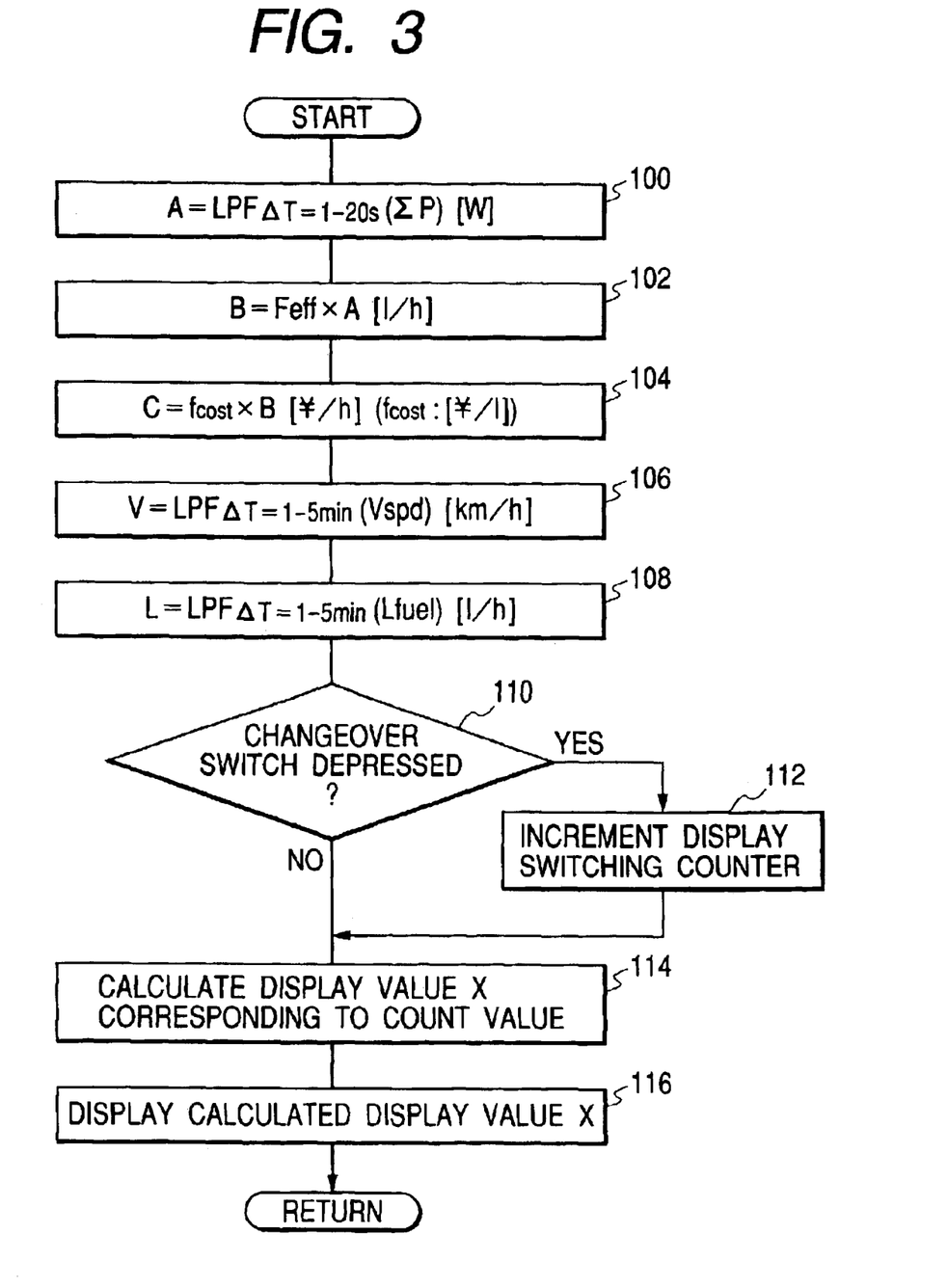
FIG. 3 is a flowchart showing the details of electric power consumption measurement and display control performed in the automotive power distribution apparatus in accordance with the preferred embodiment of the present invention.

FIG. 3 is a flowchart showing the measurement of electric power consumption and display control performed in the power ECU 11.

Figure 4:
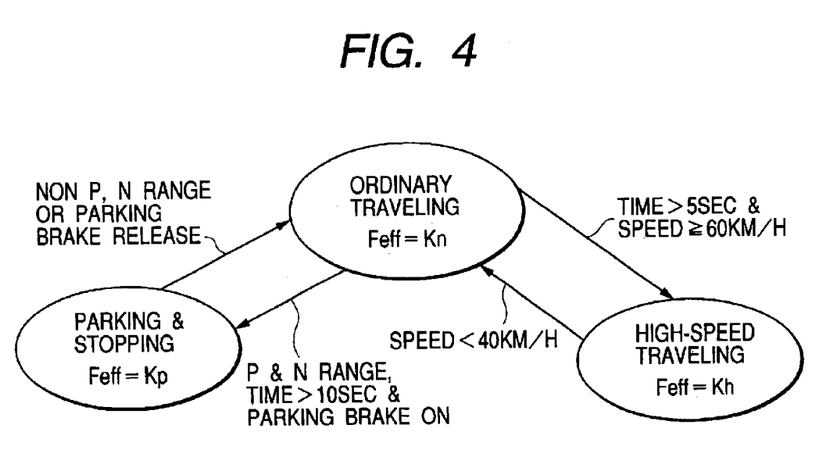
FIG. 4 is a state transition diagram showing the change of fuel conversion coefficient during a vehicle traveling condition in accordance with the preferred embodiment of the present invention.

First of all, in step 100, a total power sum of the economizable electric loads, i.e., $A=LPF_{\Delta T=1-20sec}(\Sigma p)$ [W], is measured or estimated. The measured or estimated result is averaged with a lowpass filter (LPF) having a time constant of several seconds. Next, a fuel consumption B per unit time, i.e., $B=Feff \times A$ [1/h], corresponding to the obtained total power sum, is calculated in step 102. The coefficient Feff used in step 102 is changed between Kn and Kp or between Kn and Kh according to the vehicle operating conditions shown in FIG. 4. It is also possible to change the coefficient Feff with reference to the engine operating conditions (e.g., a map expressed in relation to torque and engine speed). The vehicle or engine operating conditions can be obtained via the bus line 7 from the drive ECU 12.

Next, in step 104, the calculated fuel consumption B is converted into a cost, i.e., $C=fcost \times B$[¥/h]. The conversion coefficient fcost [¥/l] is changeable with reference to the information obtained via the bus line 7 from the Internet/ETC terminal 17. The information obtained from the Internet/ETC terminal 17 includes gasoline payment information from an ETC or any other information available through the Internet. According to this embodiment, a user is allowed to manually input the unit price of fuel.

In this respect, the calculating element (power ECU 11) of the automotive power distribution apparatus is associated with a means for inputting the unit price of fuel from the outside of the automotive vehicle. According to this arrangement, the basic data used in the calculation can be timely updated.

The means for inputting the unit price of fuel from the outside of the automotive vehicle is, for example, a ten key or any other terminal allowing a vehicle driver to manually input numerical data. It is also preferable to input the data through a wireless or radio communication device installed in an automotive vehicle.

Next, in step 106, an average vehicle speed during a predetermined period of time (e.g., 1 to 5 minutes) immediately passed, i.e., $V=LPF_{\Delta T=1-5min}(Vspd)$ [km/h], is obtained.

Then, in step 108, an actual average fuel consumption during this period of time (e.g., 1 to 5 minutes), i.e., $L=LPF_{\Delta T=1-5min}(Lfuel)$ [1/h], is obtained. More specifically, the fuel consumption can be estimated based on the current supply time of a fuel injection device (not shown) or with reference to an engine operating condition (e.g., a map defined in relation to torque and engine speed).

Next, in step 110, it is checked whether the changeover switch 16 is pushed or not. When the changeover switch 16 is pushed (i.e., YES in step 110), the procedure flow proceeds to step 112 to increment a display switching counter by one. When a count value Z of the display switching counter is maximized, the display switching counter is reset to zero.

Next, in step 114, a later-described display value X (refer to FIG. 5) corresponding to the count value Z is calculated. Then, in step 116, the calculated display value X is displayed according to a later-described display method (refer to FIG. 6).

Figure 5:
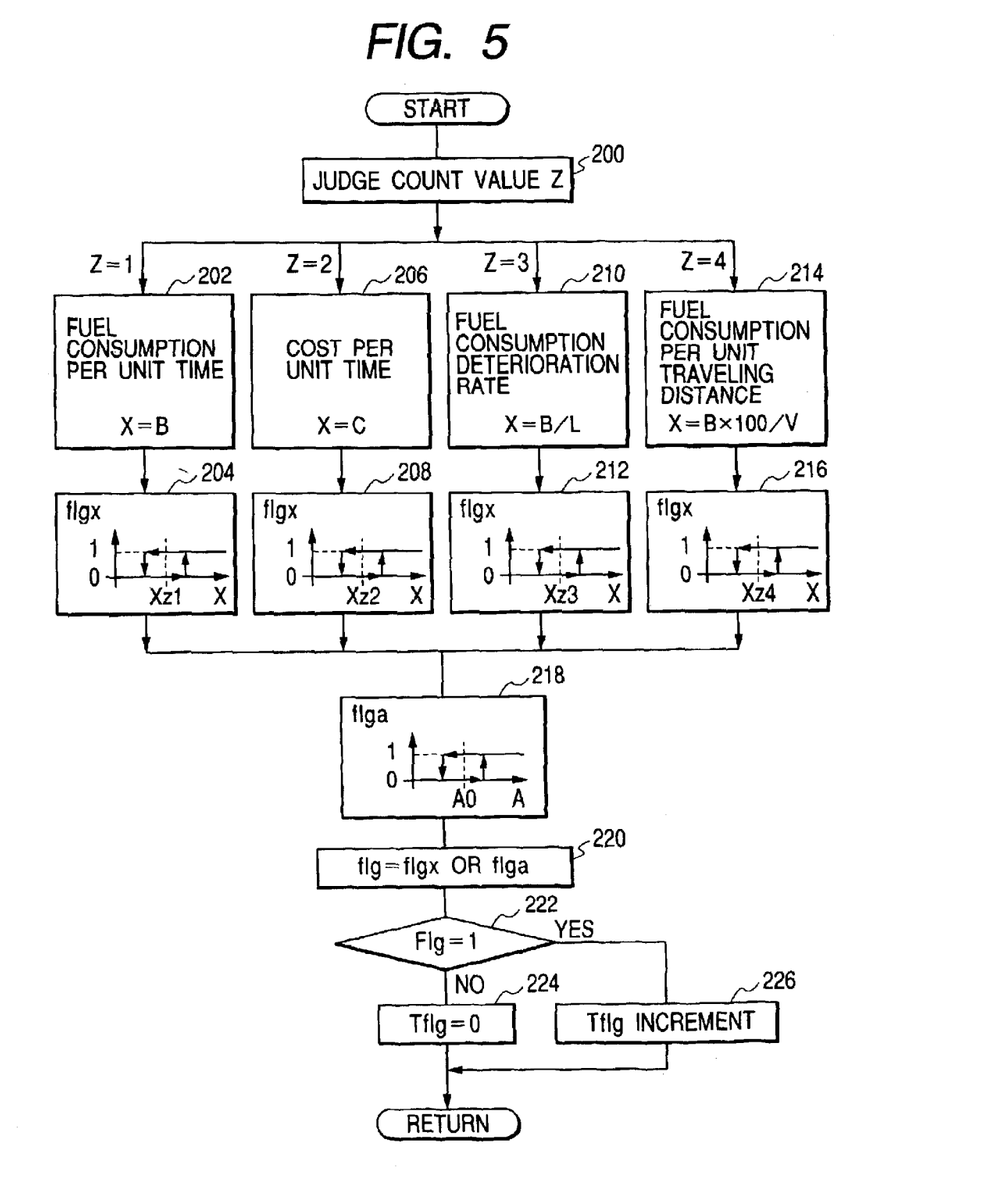
FIG. 5 is a flowchart showing the details of display value calculation in accordance with the preferred embodiment of the present invention.

Hereinafter, the detailed calculation performed in step 114 will be explained with reference to FIG. 5.

First, in step 200, the count value Z is judged. When the count value Z is 1, the procedure flow proceeds to step 202. When the count value Z is 2, the procedure flow proceeds to step 206. When the count value Z is 3, the procedure flow proceeds to step 210. And, when the count value Z is 4, the procedure flow proceeds to step 214. In each of the steps 202, 206, 210, and 214, the display value X is calculated as an index (functional value) of power consumption.

More specifically, in step 202, the display value X is calculated as a fuel consumption per unit time X=B (liter/hour). In step 206, the display value X is calculated as a cost per unit time X=C (yen/hour). In step 210, the display value X is calculated as a fuel consumption deterioration rate X=B/L (%). In step 214, the display value X is calculated as a fuel consumption per unit traveling distance X=B×100/V (liter/100 km). Although this embodiment discloses only four kinds of conversion values, it is also preferable to calculate the display value X as a fuel cost per unit traveling distance (yen/100 km) or as a $CO_2$ generation amount per unit time (g/km).

In this respect, the automotive power distribution apparatus of this embodiment includes a calculating element (i.e., power ECU 11) for calculating relevant power saving information based on a specific electric amount.

According to this arrangement, the relevant power saving information obtained from a specific electric amount, such as an electric power consumed in the economizable electric load, is usable as an effective power saving information understandable for a vehicle driver.

For example, the effective power saving information includes a fuel consumption or a fuel cost converted from the electric power consumed by an economizable electric load. Furthermore, it is possible to change the display pattern. For example, a display color or a flickering cycle can be changed adequately.

The relevant power saving information calculated by the calculating element (i.e., power ECU 11) is information relating to fuel cost reduction representing a power saving effect brought by the economizable electric load. The information relating to fuel cost reduction is calculated based on a unit price of fuel consumed by the automotive vehicle and the specific electric amount.

According to this arrangement, the power saving information is expressed in terms of the cost or economical data. Thus, the vehicle driver can immediately perceive the effect of power saving. It is also possible to calculate an exhaust emission amount to give similar effects.

The relevant power saving information calculated by the calculating element (i.e., power ECU 11) is information relating to fuel consumption per unit electric power which changes in accordance with a vehicle traveling condition or an operating condition of a power generating device.

The fuel consumption per unit electric power changes in accordance with a vehicle traveling condition or an operating condition of a power generating device. Thus, even if the electric power consumed in an economizable electric load is constant, the fuel amount consumed in an activated economizable electric load or incurred economical burden has the nature of varying in accordance with a vehicle traveling condition or an operating condition of a power generating device.

According to this arrangement, the specific electric amount or the relevant power saving information is adjustable in accordance with a vehicle traveling condition or an operating condition of a power generating device. Thus, the power saving can be performed appropriately.

The calculating element (i.e., power ECU 11) calculates a fuel consumption equivalent to an electric power consumed in the economizable electric load based on the fuel consumption per unit electric power and the specific electric amount. This provides an indication understandable for a vehicle driver.

Furthermore, the calculating element (i.e., power ECU 11) converts power consumption data of the economizable electric load obtained based on a specific electric amount into relevant power saving information which is expressible by using a plurality kinds of the units for display and outputs the converted relevant power saving information to a power saving promoting element (i.e., indicator ECU 13 and power display section 14). A switching element (i.e., changeover switch 16) is provided for changing the units to be adopted.

According to this arrangement, it is possible to change the units for displaying the relevant power saving information according to user's preference.

The selected power saving information is directly displayed or once modified by using a threshold and then displayed. It is also possible to use a stepwise or progressive display for the power saving information by using a plurality kinds of display signals so as to be discriminable for a vehicle driver. The threshold used for this kind of stepwise or progressive display can be set independently for the units for displaying the power saving information.

The units for display used in this embodiment include at least two units selected from the group consisting of a fuel consumption deterioration rate, a consumed electric power, a fuel consumption per unit traveling distance, a fuel consumption per unit time, a fuel cost per unit traveling distance, and a fuel cost per unit time.

This allows a vehicle diver to select a favorite one among a wide variety of the units for displaying the power saving information.

Next, in each of steps 204, 208, 212, and 216, it is judged whether or not the display value X exceeds a predetermined threshold $X_{zi}$ (i=1, 2, 3, 4). In this case, as illustrated in each of steps 204, 208, 212, and 216, a hysteresis is given to each threshold. When the display value X exceeds the threshold value $X_{zi}$ (i=1, 2, 3, 4), a flag 'flgx' is set to 1 (i.e., flgx=1).

Then, in the next step 218, it is judged whether or not the power consumption A exceeds a predetermined threshold A0. In this case, as illustrated in step 218, a hysteresis is given to the threshold A0. When the power consumption A exceeds the threshold value A0, a flag 'flga' is set (i.e., flga=1).

Then, in the next step 220, a logical OR between two flags 'flgx' and 'flga' is obtained, i.e., flg=flgx OR flga.

Then, in step 222, it is checked whether or not the logical OR value (i.e., flag 'flg') is 1. When the 'flg' is 1, i.e., when at least one of the flags 'flgx' and 'flga' is 1 (YES in step 222), the procedure flow proceeds to step 226 to increment a flag sustaining time Tflg. The flag sustaining time Tflg has a predetermined upper limit. When the 'flg' is 0, i.e., when both of the flags 'flgx' and 'flga' are 0 (NO in step 222), the procedure flow proceeds to step 224 to reset the flag sustaining time Tflg (i.e., Tflg=0). Although the above-described threshold values Xzi (i=1, 2, 3, 4) and A0 are set beforehand as default values, it is possible to change their values into arbitrary values through a navigation system or any other input device.

Figure 6:
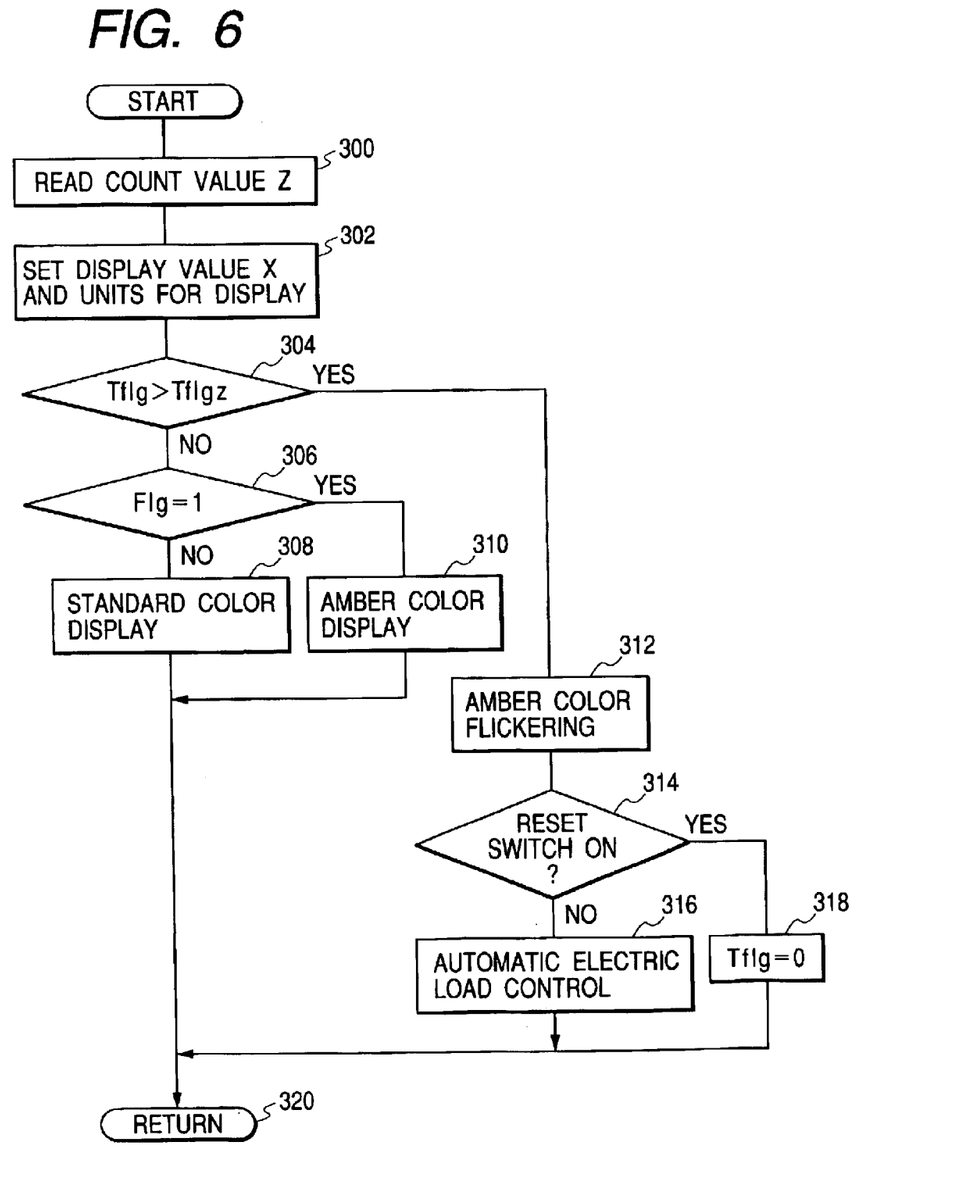
FIG. 6 is a flowchart showing the details of display operation in accordance with the preferred embodiment of the present invention.

Hereinafter, the detailed calculation performed in step 116 will be explained with reference to FIG. 6.

First, in step 300, the count value Z is read. Next, in step 302, the display value X corresponding to the readout count value Z and the units for a numerical value to be displayed are stored into a register. Next, in step 304, it is judged whether or not the flag sustaining time Tflg exceeds a predetermined time Tflgz. When the flag sustaining time Tflg is not larger than the predetermined time Tflgz (i.e., NO in step 304), the procedure flow proceeds to step 306 to make a judgement as to whether the logical OR flag 'Flg' is 1. When the flag 'Flg' is 0 (i.e., NO in step 306), the procedure flow proceeds to step 308 to perform a standard color display. When the flag 'Flg' is 1 (i.e., YES in step 306), the procedure flow proceeds to step 310 to perform an amber color display. When the flag sustaining time Tflg is larger than the predetermined time Tflgz (i.e., YES in step 304), the procedure flow proceeds to step 312 to perform an amber color flickering display. In this case, the sound effect is usable together with the color display. The brightness of color display is adjustable. The flickering interval is changeable.

In this respect, the automotive power distribution apparatus of this embodiment includes a display element (i.e., power display section 14) for changing at least one of a display brightness, a display color, a display light flickering interval, and a sound effect with reference to a level of a specific electric amount or relevant power saving information.

Furthermore, the display element (i.e., power display section 14) of the automotive power distribution apparatus of this embodiment outputs a warning signal (i.e., amber color flickering display) when a specific electric amount or relevant power saving information exceeds a predetermined level. This surely informs a vehicle driver of excessive power consumption in an economizable electric load.

After finishing the step 312, the procedure flow proceeds to step 314 to make a judgement as to whether the reset switch 15 is pushed. When the reset switch 15 is not pushed (i.e., NO in step 314), the procedure flow proceeds to step 316 to perform an automatic electric load control for the economizable electric loads. More specifically, a predetermined number of designated electric loads are deactivated or reduced in operation power one after another (according to a predesignated priority order) considering the importance of respective economizable electric loads. In other words, each economizable electric load is brought into a power saving mode. The command for deactivating or reducing each economizable electric load is sent from the power ECU 11 to the corresponding controller 6i (i=A, B, C, D) via the bus line 7.

Namely, the power saving promoting element of the automotive power distribution apparatus of this embodiment includes a control element for activating or deactivating each economizable electric load in a power saving mode for reducing the specific electric amount when the specific electric amount exceeds a predetermined threshold level.

With this arrangement, a power saving operation for the economizable electric load can be simply performed.

As described above, the control element of the automotive power distribution apparatus of this embodiment brings each economizable electric load into a power saving mode when a specific electric amount or relevant power saving information exceeds a predetermined level continuously for a predetermined time.

According to this control, the driving feeling can be kept properly (without causing a chattering phenomenon) because the economizable electric load is brought into the power saving mode only when the specific electric amount or relevant power saving information exceeds a predetermined level continuously for a predetermined time.

In the same manner, it is preferable not to change the display pattern for the power saving information when a change of electric power consumption in an economizable electric load is very temporary and does not last for a predetermined time.

The power saving promoting element includes a display element (i.e., power display section 14) for realizing a visual or audible display to let a vehicle driver know the specific electric amount or relevant power saving information. The vehicle driver can surely know or perceive the information relating to the electric power consumed in the economizable electric load. In other words, the vehicle driver is surely encouraged to save the electric power.

Alternatively, it is preferable that the control element of the automotive power distribution apparatus of this embodiment stops power supply to each economizable electric load when the specific electric amount or the relevant power saving information exceeds the predetermined level continuously for the predetermined time.

Regarding the contents of the automatic electric load control for the economizable electric loads, Japanese patent application No. 2000-402724 assigned to the same applicant as that of this application should be referred to.

When the reset switch 15 is pushed (i.e., YES in step 314), the procedure flow proceeds to step 318 to reset the flag sustaining time Tflg to 0 (i.e., Tflg=0).

In this respect, the control element of the automotive power distribution apparatus of this embodiment includes a means for releasing the power saving mode or resuming the power supply to the economizable electric load in response to a reset signal entered by the vehicle driver. This allows a vehicle driver to easily cancel the power saving mode and resume an ordinary operating mode when the driver changes his/her mind. The power saving mode may be an operating mode in which a list of economizable electric loads to be deactivated is flexibly changed according to the degree of electric power consumed in each economizable electric load.

The control element of the automotive power distribution apparatus of this embodiment changes the threshold level according to a command signal entered by a vehicle driver. This allows the vehicle driver to arbitrarily change the threshold level according to his/her preference or considering a vehicle traveling condition or an operating condition of a power generating device.

It is possible to simultaneously perform the control for putting any specific ECU into a sleep mode and canceling it by pushing the reset switch 15 when the automatic electric load control is performed in step 316. In this case, a command signal for this control is sent out to the bus line 7.

Although the above-described embodiment is explained based on an internal combustion engine using the gasoline fuel, it is however possible to apply this invention to any other automotive vehicle, hybrid vehicle or fuel cell powered vehicle which installs an internal combustion engine using different fuel, such as light oil, hydrogen, and methanol. Furthermore, an external charging (i.e., electric power amount and cost) of a main battery in an electric automobile can be regarded as equivalent to fuel charging. Thus, the present invention can be applied to an electric automobile.

Incorporating this system into an automotive vehicle allows a user to visually check the effect of reducing the power consumption. A user aiming to reduce the fuel cost will be able to confirm the effect of saving electric power and will be satisfied with his/her achievement.

What is claimed is:

1. An automotive power distribution apparatus for supplying electric power to a plurality of car-equipped electric loads from an automotive power source including a battery, comprising:
   a detecting element for detecting a specific electric amount separately from an essential electric amount, said specific electric amount representing an electric power consumption of specific electric loads including at least one economizable electric load which is selectively turned on and off so as to serve as an objective to be economized in power consumption, and said essential electric amount representing an electric power consumption of essential electric loads which are not economizable and essentially required for driving an automotive vehicle; and
   a power saving promoting element for promoting power saving by reducing power consumption in said economizable electric load with reference to said specific electric amount,
   wherein said detecting element is operative to detect the specific electric amount representing the electric power consumption of the specific electric loads independently of a total power demand of the specific electric loads and the essential electric loads.

2. The automotive power distribution apparatus in accordance with claim 1, wherein said detecting element does not detect said essential electric amount.

3. The automotive power distribution apparatus in accordance with claim 1, wherein said power saving promoting element includes a display element for realizing a visual or audible display to let a vehicle driver know said specific electric amount or relevant power saving information.

4. The automotive power distribution apparatus in accordance with claim 3, wherein said display element changes at least one of a display brightness, a display color, a display light flickering interval, and a sound effect with reference to a level of said specific electric amount or said relevant power saving information.

5. The automotive power distribution apparatus in accordance with claim 3, wherein said display element outputs a warning signal when said specific electric amount or said relevant power saving information exceeds a predetermined level.

6. The automotive power distribution apparatus in accordance with claim 1, wherein said power saving promoting element includes a control element for activating or deactivating said economizable electric load in a power saving mode for reducing said specific electric amount when said specific electric amount exceeds a predetermined threshold level.

7. The automotive power distribution apparatus in accordance with claim 6, wherein said control element brings said economizable electric load into said power saving mode when said specific electric amount or said relevant power saving information exceeds a predetermined level continuously for a predetermined time.

8. The automotive power distribution apparatus in accordance with claim 7, wherein said control element includes a means for releasing said power saving mode or resuming the power supply to said economizable electric load in response to a reset signal entered by the vehicle driver.

9. The automotive power distribution apparatus in accordance with claim 7, wherein said control element changes said threshold level according to a command signal entered by a vehicle driver.

10. The automotive power distribution apparatus in accordance with claim 6, wherein said control element stops power supply to said economizable electric load when said specific electric amount or said relevant power saving information exceeds a predetermined level continuously for a predetermined time.

11. The automotive power distribution apparatus in accordance with claim 1, wherein said specific electric amount is a command signal supplied to a control means for activating said economizable electric load or a signal relating to said command signal.

12. The automotive power distribution apparatus in accordance with claim 1, wherein the specific electric amount detected by said detecting element includes an electric amount relating to a current flowing across a user optional terminal which is attached to said battery for supplying electric power to a user optional electric load serving as said economizable electric load.

13. The automotive power distribution apparatus in accordance with claim 1, further comprising a calculating element for calculating relevant power saving information based on said specific electric amount.

14. The automotive power distribution apparatus in accordance with claim 13, wherein said relevant power saving information calculated by said calculating element is information relating to fuel cost reduction representing a power saving effect brought by said economizable electric load, and said information relating to fuel cost reduction is calculated based on a unit price of fuel consumed by the automotive vehicle and said specific electric amount.

15. The automotive power distribution apparatus in accordance with claim 14, wherein said calculating element is associated with a means for inputting said unit price of fuel from the outside of the automotive vehicle.

16. The automotive power distribution apparatus in accordance with claim 13, wherein said relevant power saving information calculated by said calculating element is information relating to fuel consumption per unit electric power which changes in accordance with a vehicle traveling condition or an operating condition of a power generating device.

17. The automotive power distribution apparatus in accordance with claim 16, wherein said calculating element calculates a fuel consumption equivalent to an electric power consumed in said economizable electric load based on said fuel consumption per unit electric power and said specific electric amount.

18. The automotive power distribution apparatus in accordance with claim 1, further comprising:
   a calculating element for converting power consumption data of said economizable electric load obtained based on said specific electric amount into relevant power saving information which is expressible by using a plurality kinds of the units for display and for outputting the converted relevant power saving information to said power saving promoting element, and
   a switching element for changing the units to be adopted by said calculating element.

19. The automotive power distribution apparatus in accordance with claim 18, wherein said units for display include at least two units selected from the group consisting of a fuel consumption deterioration rate, a consumed electric power, a fuel consumption per unit traveling distance, a fuel consumption per unit time, a fuel cost per unit traveling distance, and a fuel cost per unit time.

* * * * *